United States Patent [19]  
Murray

[11] 3,844,808  
[45] Oct. 29, 1974

[54] SYNTHETIC AGGREGATES MADE FROM IMPURE BAUXITE

[75] Inventor: Ransom James Murray, Gravesend, England

[73] Assignee: The Associated Portland Cement Manufacturers Limited, London, England

[22] Filed: Dec. 29, 1971

[21] Appl. No.: 213,855

[30] Foreign Application Priority Data
Jan. 4, 1971   Great Britain.................. 236/71

[52] U.S. Cl. .............................. 106/288 B, 106/304
[51] Int. Cl. ........................................... C08h 17/02
[58] Field of Search ............... 106/309, 288 B, 304

[56] References Cited
UNITED STATES PATENTS
3,607,339   9/1971   Davies ............................... 106/309

FOREIGN PATENTS OR APPLICATIONS
1,158,208   7/1969   Great Britain

*Primary Examiner*—Delbert E. Gantz
*Assistant Examiner*—S. Berger
*Attorney, Agent, or Firm*—Baldwin, Wight & Brown

[57] ABSTRACT

A method of preparing a synthetic aggregate useful as a roadstone by sintering an impure bauxite, comprising the steps of grinding the bauxite to give a particle size in the range 35 percent residue on a 52 mesh B.S. sieve to 1 percent residue on a 170 mesh B.S. sieve, agglomerating the particles and sintering the bauxite at least until rapid changes in bulk density cease, at a temperature at least 35° below the temperature which would result in minimum porosity of the fired material but sufficiently high that the product has an A.A.V. not exceeding 12.

9 Claims, No Drawings

SYNTHETIC AGGREGATES MADE FROM IMPURE BAUXITE

This invention relates to synthetic aggregates suitable for use as a roadstone having a satisfactory resistance to polishing, this being a measure of skid resistance generally expressed as high "polished stone value" (PSV) and simultaneously a satisfactory resistance to abrasion, expressed as a low aggregate abrasion value (AAV).

It is well known that bauxites of high purity, that is with contents of $Fe_2O_3$ and $SiO_2$ below 2.5 percent, and 7 percent can be calcined at 1,600°C or above to give a dense, hard product which is suitable for roadstone, but such bauxites are expensive due to their limited occurrence and the considerable demand for them as raw materials for the manufacture of refractories.

The object of the present invention is to enable a synthetic aggregate suitable for use as roadstone to be produced from less pure and hence cheaper bauxites. Such bauxites may be broadly classed into two types, according to their impurities. Ferruginous bauxites contain iron oxide as their main impurity, this being present to the extent of 15-25 percent by weight in the bauxite before calcination, whilst the content of silica is at a much lower level, in the order of 2 percent by weight. Siliceous bauxites contain some 10-20 percent silica before calcination, with iron oxide at a level similar to that in the ferruginous bauxites. The methods of processing described in this invention can also be used for grades of bauxite intermediate between the above.

We have found that when such bauxites are calcined, the PSV and AAV of the calcined product are strongly dependent upon the porosity, whilst at the same time a certain minimum degree of sintering must occur if the resultant aggregate is to have an adequate AAV and resistance to crushing when in use.

Previous attempts to utilise siliceous and ferruginous bauxites for the preparation of artificial aggregates have involved sintering the material in the form of lumps obtained by crushing of bauxite rock. The results obtained have been very erratic; in general siliceous bauxites have given unsatisfactory results, whilst ferruginous bauxites have proved variable, sometimes giving good results when calcined as lumps, but on other occasions giving rather poor results. We believe that these poor results have been due partly to the lack of homogeneity of the raw material, with the result that different lumps in the same batch behave differently upon sintering, combined with the fact that, particularly in the case of siliceous bauxties, it is often not possible to obtain at the same time both an adequate degree of sintering and a suitable degree of porosity in the sintered product when sintering crushed rock.

When a natural bauxite is calcined, various processes take place. During an initial preheating stage during which the material is raised to about 800°C, bound and unbound water is removed from the material, with a consequent increase in its porosity. Further heating to a temperature of 1,200°-1,600°C involves sintering of the material, in which adjacent crystals of the material blend together to increase its density, and chemical reduction involving reduction of the 3 valent iron present to 2 valent iron, the loss of oxygen involved causing an increase in porosity. This reduction process normally occurs over a higher range of temperatures than that at which sintering commences, and thus, as the firing temperature is increased, it is most often found that a decrease in porosity occurs in the fired product as sintering commences, followed by an increase in porosity as chemical reduction begins to occur. By measuring the lump density of samples of the material fired at various temperatures, the porosity of the product relative to temperature may be assessed, and a curve prepared of porosity against temperature. We have found that the shape of this curve during the sintering and reduction stages of the burning process varies quite widely between different bauxites, and between samples of the same bauxite having different initial particle size distributions. We have also found that aggregates having satisfactory properties as roadstones are obtained when the sintering process is carried out at a temperature somewhat below that at which minimum porosity of the product is obtained, the temperature falling on a point on the curve at which porosity is changing rapidly with temperature, and the porosity itself falls in the range 15- 35 percent, preferably 20-30 percent.

The bauxite should not be ground to a particle size range that is either too fine or too coarse, since in these cases slight variations in processing conditions or lack of homogeneity of the raw material is likely to lead to an over or under-sintered product.

As mentioned above, we have found that the behaviour of these bauxites on sintering is considerably influenced by the initial particle size of the bauxite being treated, and the object of the invention is to provide a method of sintering a wide range of impure bauxites to form synthetic aggregates having satisfactory properties as roadstone.

According to the invention, a method of sintering an impure bauxite to provide a synthetic aggregate useful as a roadstone comprises the steps of grinding the bauxite to give a particle size in the range 35 percent residue on a 52 mesh B.S. sieve to 1 percent residue on a 170 mesh B.S. sieve, agglomerating the particles and sintering the bauxite, at least until rapid changes in bulk density cease, at a temperature at least 35°C below the temperature which would result in minimum porosity of the fired material but sufficiently high that the product has an A.A.V. not exceeding 12. Preferably the firing temperature is in the range 35° – 70°C below the temperature giving minimum porosity where firing is carried out in air, and up to 40°C lower still when combustion gases are present. A further lowering of the firing temperature is permissible when the ground bauxite has been agglomerated by extrusion.

Agglomeration is necessary because the particle size range to which the bauxite is ground is too small for roadstone purposes. Examples of suitable methods of agglomeration are as follows:

Where, as will usually be the case, a rotary kiln is utilized to sinter the bauxite, the latter may be ground to the required particle size, slurried with water, and pumped into the kiln, where nodulization will occur in a manner determined by the temperature and speed of rotation of the kiln.

Alternatively, the ground bauxite is pugged with water, with the addition where necessary of a binder and lubricant, and the resultant pug may be extruded; suitable binders are for example bentonite or other plastic clays, methyl cellulose, alginates, tar oil residue, molasses and starch. With many siliceous bauxites the addition of binders is unnecessary.

Alternatively again, nodulization of the ground bauxite may be carried out by balling on a rotary pan with water. The nodules produced may be strengthened by the addition of up to 5 percent of sodium silicate.

In a preferred embodiment of the invention, and as a preliminary step, the lump density of the sinter, produced by laboratory scale burning at a range of different temperatures of ground up and modulised samples of the impure bauxite it is desired to use as a raw material, is determined. To obtain a wider range of information, the bauxite may be ground to various levels of fineness each defined sufficiently accurately by one B.S. sieve residue — for example 15 percent by weight on a 170 mesh, 15 percent on a 100 mesh, and 15 percent on a 52 mesh sieves.

Grinding to an insufficiently fine particle size range will result in difficulties in firing and insufficient homogenisation, whilst grinding the bauxite too fine tends to result in over sintering, and unsatisfactory P.S.V.

Pellets are made up and fired at a range of temperatures in a laboratory furnace with heating rate, time at maximum temperature and cooling rate designed to simulate the regime to be employed in the full-scale manufacturing kiln, which may be a rotary or any other type of kiln or furnace suitable for sintering. The lump volume of the fired pellets is determined by measuring the force necessary to sink them in mercury (as described in B.S. 1902: Part 1A). The family of curves of lump density (which is inversely proportional to porosity) versus temperature is then used to determine the firing temperature.

The firing temperature is usually 35°–110°C below that shown by the appropriate curve as giving minimum porosity of the fired samples, various factors influencing the optimum temperature. The temperature should be selected so that it falls on a part of the curve where porosity is changing relatively rapidly with temperature, and preferably so that the porosity of the fired product is between 15 percent and 35 percent and preferably between 20 percent and 30 percent. The porosity in these materials is determined by the opposing process of sintering, leading to densification, and chemical reduction occurring with the change in valency of the iron present from $Fe^{III}$ to $Fe^{II}$, the release of oxygen which occurs causing an increase in porosity.

Where the bauxite is fired in air, the firing temperature is preferably 35°–70°C below the temperature giving minimum porosity, a further reduction of up to 40°C being appropriate where sintering is carried out in the presence of combustion gases. A reduction in firing temperature is also permissible where agglomeration of the ground bauxite is by pugging followed by extrusion. The duration of firing is not critical, provided that it is sufficiently long for rapid changes in the bulk density of the material being fired to have ceased. Further increase in firing time has little effect on the product, and a time at the firing temperature of about 20 mins. is normally both appropriate, and where firing is carried out in a rotary kiln, extremely convenient.

With the aid of this type of assessment lumps or nodules prepared from ground ferruginous or siliceous bauxite, the size of the lumps or nodules being 2mm–20mm according to the intended application of the aggregate, or larger if the material is to be crushed after firing, can be burned in a rotary kiln successfully by preheating them from room temperature to about 800°C not too rapidly, to remove bound and unbound water without undue fracture of the particles and then in about 45 minutes heating them to the predetermined firing temperature which will normally be in the range 1,200°–1,450°C, holding this temperature for about 20 minutes and then cooling at a rate such as to minimise cracking, which would reduce aggregate impact value. The material may be fed directly to the kiln or the preheating stage may be carried out in a moving grate, or any other suitable preheater, using waste gases from the rotary kiln.

The invention is illustrated by the following examples in which the PSV and AAV figures were determined according to the method set out in B.S.S.812. To be acceptable, PSV figures should be as high as possible and preferably above 65, and AAV figures should be as low as possible and preferably below 12.

EXAMPLE 1

Samples of a siliceous bauxite were ground to give size distribution of 15 percent residue on a 52 B.S. sieve and 15 percent residue on a 100 B.S. sieve the ground samples being pugged and the pug either fired in lumps or extruded and then fired. The bauxite was also fired at different temperatures as raw lumps without grinding. Results of these tests were set out in the following table. Both the pugged and the pugged and extruded samples showed a minimum porosity when fired at about 1,450°C.

| Raws Lumps | | | Pugged | | | Pugged and Extruded | | |
|---|---|---|---|---|---|---|---|---|
| temp[a] | PSV | AAV% | temp[b] | PSV | AAV% | temp[b] | PSV | AAV% |
| 1150 | 48 | 9.2 | (15% + 52 mesh) | | | (15% + 100 mesh) | | |
| 1250 | 52 | 5.2 | 1400 | 72 | 10.6 | 1325 | 74 | 6.4 |
| 1350 | 55 | 2.1 | (15% + 100 mesh) | | | 1325 | 73 | 5.9 |
| 1450 | 57 | 4.9 | 1400 | 67 | 4.2 | | | |
| 1550 | 57 | 3.8 | | | | | | |

[a]Fired for 20 min at temperature indicated in deg. Centigrade
[b]Fired for 20 min at temperature indicated in deg. Centigrade at the fineness given

EXAMPLE 2

Samples of two batches of a ferruginous bauxite were ground to 15 percent residue on a 100 B.S. sieve and the ground samples were pugged and extruded. The bauxite was also fired at different temperatures as raw lumps without grinding. Results of these tests are set out in the following table. The ground samples showed minimum porosity when fired at 1,450°C.

| | Raw lumps | | | Pugged and extruded after grinding to 15% residue on 100 mesh sieve | | |
|---|---|---|---|---|---|---|
| | temp" | PSV | AAV% | temp" | PSV | AAV% |
| Batch 1 | 1350 | 71 | 4.2 | 1415 | 77 | 4.0 |
| | 1450 | 63 | 3.9 | | | |
| Batch 2 | 1350 | 60 | 4.4 | 1390 | 74 | 4.6 |

" Fired for 20 min at temperature indicated in degree Centigrade

EXAMPLE 3

Samples of ferruginous bauxite were prepared as in the previous example, except that the pug was not extruded, and the pug was fired in an electric furnace for 20 minutes at various firing temperatures. The results are tabulated below:

| Firing Temperature | P.S.V. | A.A.V. |
|---|---|---|
| 1315°C | 82 | 51.1 |
| 1350°C | 73 | 20.0 |
| 1375°C | | 8.1 |
| 1410°C | 59 | 2.8 |
| 1450°C | 58 | 3.7 |

EXAMPLE 4

Samples of a different siliceous bauxite from that used in Example 1 were ground to a 20 percent residue on a 100 mesh B.S. sieve and also to a 15 percent residue on a 170 mesh B.S. sieve, and the samples were pugged and fragments of the extruded pug were fired for 20 minutes at various firing temperatures. The results are shown in the following table

| Particle Size Distribution | Firing Temperature | P.S.V. | A.A.V. |
|---|---|---|---|
| 20% >100 B.S. Mesh (Firing temperature giving minimum porosity 1400°C) | 1305°C | 72 | 15.1 |
| | 1335°C | 71 | 11.2 |
| | 1340°C | 76 | 7.6 |
| | 1345°C | 73 | 5.7 |
| | 1380°C | 62 | 5.0 |
| 15% >170 B.S. Mesh (Firing temperature giving minimum porosity 1375°C) | 1270°C | 69 | 9.5 |
| | 1310°C | 71 | 2.3 |
| | 1330°C | 74 | 1.6 |

What we claim is:

1. A method of preparing a synthetic aggregate useful as a roadstone by sintering a material consisting essentially of a member of the group consisting of siliceous bauxite and ferruginous bauxite, characterized in that it comprises the steps of grinding said material to give a particle size in the range 35 percent residue on a 52 mesh B.S. sieve to 1 percent residue on a 170 mesh B.C. sieve, agglomerating the particles and sintering said material at least until rapid changes in bulk density cease, at a temperature at least 35° below the temperature which would result in minimum porosity of the fired material but sufficiently high that the product has an A.A.V. not exceeding 12.

2. A method according to claim 1, characterised in that the bauxite is ground to give a residue of between 15 percent by weight on a 52 mesh B.S. sieve and 15 percent by weight on a 170 mesh B.S. sieve.

3. A method according to claim 2, characterised in that the bauxite is ground to give a residue of about 15 percent by weight on a 100 mesh B.S. sieve.

4. A method according to claim 1, characterised in that the firing temperature is 35°C–70°C below the firing temperature giving minimum porosity, and up to 110°C below the firing temperature giving minimum porosity where firing is carried out in the presence of combustion gases.

5. A method according to claim 1, characterised in that the firing temperature is selected so that the porosity of the product is in the range 15 – 35 percent.

6. A method according to claim 5, characterised in that the firing temperature is selected so that the porosity of the product is in the range 20 – 30 percent.

7. A method according to claim 1 characterised in that the ground bauxite is agglomerated by pugging followed by extrusion.

8. A method according to claim 1, wherein the bauxite is ferruginous bauxite.

9. A method according to claim 2, wherein the bauxite is a siliceous bauxite.

* * * * *